No. 722,033. PATENTED MAR. 3, 1903.
W. A. McCARTER.
DENTAL CLAMP.
APPLICATION FILED SEPT. 9, 1902.
NO MODEL.

Witnesses
Elmer Leavey
C. D. Davis.

Inventor
William A. McCarter
By R. W. Bishop
Attorney.

UNITED STATES PATENT OFFICE.

WILLIAM A. McCARTER, OF TOPEKA, KANSAS.

DENTAL CLAMP.

SPECIFICATION forming part of Letters Patent No. 722,033, dated March 3, 1903.

Application filed September 9, 1902. Serial No. 122,715. (No model.)

*To all whom it may concern:*

Be it known that I, WILLIAM A. MCCARTER, a citizen of the United States of America, residing at Topeka, in the county of Shawnee and State of Kansas, have invented certain new and useful Improvements in Dental Clamps, of which the following is such a full, clear, and exact description as will enable others skilled in the art to which it appertains to make and use the same, reference being had to the accompanying drawings, forming a part hereof.

My invention relates to improvements in clamps for holding dental matrices and rubber dams in position during the filling of cavities in teeth; and it consists in certain novel features hereinafter first fully described and then particularly pointed out in the claims.

Figure 1:
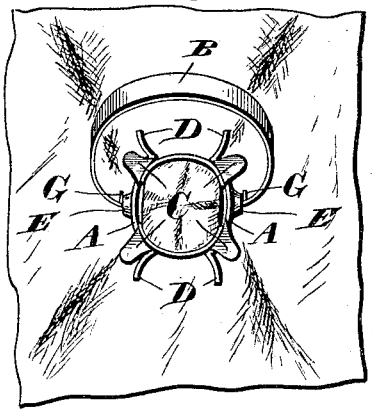
Figure 2:
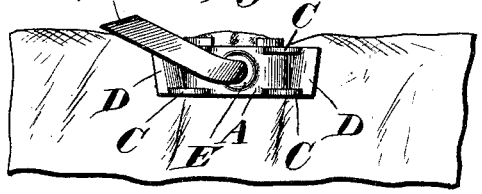
Figure 3:
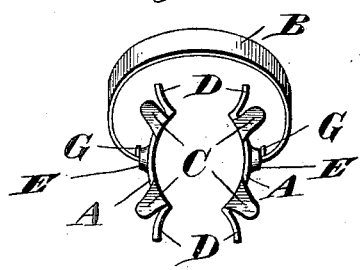
Figure 4:
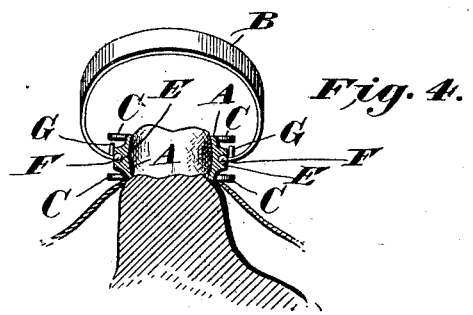

In the annexed drawings, which fully illustrate my invention, Figure 1 is a plan view showing the clamp applied to hold a matrix and a rubber dam in position. Fig. 2 is a front elevation of the same. Fig. 3 is a plan view of the clamp removed, and Fig. 4 is a view showing the jaws in transverse section and the holding-spring in elevation.

In carrying out my invention I employ clamping-jaws A and a holding-spring B, connecting the jaws and adapted to bind them upon a tooth. The jaws A are of a concavo-convex form, so as to fit closely against a tooth, and are provided at their edges near their ends with the outwardly-projecting lips C, adapted to hold down a rubber dam, as will be readily understood. In order to give a greater range of usefulness to the device, I make one edge of the jaw somewhat longer than the other, so that by reversing the jaw the same clamp may be used on teeth of different shapes or sizes and to close cavities of various sizes. The concavo-convex forms of the jaws impart a slight resiliency to the same, and this property I increase by forming the curved wings D at the ends of the jaws. These wings by bearing against the adjoining teeth serve to reinforce the jaws, so that they will effectually hold a matrix in place when an approximate cavity is to be filled. When the cavity to be filled is in the front or back of the tooth, the jaw itself forms a matrix. On the outer face of each jaw at the center of the same is a globular socket E, in which is fitted a ball or spherical enlargement F on the end of the holding-spring B, whereby the jaw is hung on the spring so as to turn freely in all directions. The spring is a bow or U-shaped spring and is adapted to pass over the teeth and by its resiliency force the jaws firmly against the opposite sides of the tooth to be treated. On the inner side of the spring near the ends thereof I form the lugs or guards G, which are adapted to bear against the outer faces of the jaws and thereby prevent the same from falling away from the tooth while the device is in use.

In practice the jaws are mounted loosely on the ends of the holding-spring and are occasionally knocked away from the tooth by accidental blows caused by slipping of the plugging-tool. To prevent such dropping of the jaw, I provide the guard G, which bears against the outer face of the jaw, so as to positively hold the upper edge of the same against the tooth.

The device is applied to the tooth by forceps, so as to embrace it, and will firmly hold the rubber dam or the matrix in position. Before being applied the jaws are turned so as to bring the longer or shorter edge uppermost, and thereby properly accommodate the wings at the ends of the jaws to a larger or smaller space between the teeth. The device may be applied to a tooth in any position, as the connection between the jaws and the holding-spring permits the jaws to be turned in any direction and the spring to be afterward turned down out of the way of the operator. The spring-wings at the ends of the jaws bear firmly against the ends of the metal matrix and cause the same to positively close the cavity, so that the filling will be exact. These wings project freely from the ends of the jaws, so that when the clamp is in position they act as springs to hold the ends of the jaws squarely and firmly against the tooth. It will be noticed that the inner face of the jaw is concave both longitudinally and transversely, so as to fit closely against the tooth and have a broad bearing thereon. The clamp thus obtains a firm hold on the tooth, and all liability of scratching or cutting into the surface of the tooth is avoided.

Having thus described my invention, what I claim, and desire to secure by Letters Patent, is—

1. A dental clamp comprising a holding-spring and clamping-jaws mounted on the ends of said spring and capable of movement in all directions thereon.

2. A dental clamp comprising a holding-spring and clamping-jaws mounted directly on the ends of the spring by ball-and-socket connections.

3. A dental clamp comprising a holding-spring and clamping-jaws mounted on the ends of the said spring, the spring being provided with guards adapted to bear against the jaws.

4. A dental clamp consisting of a bow-spring and clamping-jaws mounted on the ends of the same by universal joints, the said jaws having curved wings at their ends and outwardly-projecting lips at their edges.

5. A dental clamp provided with clamping-jaws the inner faces of which are concave both longitudinally and transversely.

6. A dental clamp having a clamping-jaw provided with free spring-wings at its ends adapted to rest vertically against adjoining teeth.

7. A dental clamp having clamping-jaws with concave inner faces provided with free spring-wings projecting from their ends.

In testimony whereof I have signed this specification in the presence of two subscribing witnesses.

WILLIAM A. McCARTER.

Witnesses:
FRED. A. KOESTER,
HARMON E. WENTWORTH.